US012729260B2

(12) United States Patent
Goetter et al.

(10) Patent No.: US 12,729,260 B2
(45) Date of Patent: Sep. 8, 2026

(54) HYBRID RESINS FOR HIGH VOLTAGE APPLICATIONS

(71) Applicants: Elantas North America, Inc., St. Louis, MO (US); ELANTAS EUROPE S.R.L., Collecchio (IT)

(72) Inventors: Ronald Goetter, Maryville, IL (US); Nathan Hussey, St. Louis, MO (US); Mattia Ferraris, Emilia-Romagna (IT); Paola Gherardi, Emilia-Romagna (IT); Nicola Cuminetti, Emilia-Romagna (IT); Marco Viola, Emilia-Romagna (IT); David Vines, Imperial, MO (US); Thomas James Murray, Chesterfield, MO (US)

(73) Assignees: Elantas North America, Inc., St. Louis, MO (US); Elantas Europe S.R.L., Colleccio (IT)

( * ) Notice: Subject to any disclaimer, the term of this patent is extended or adjusted under 35 U.S.C. 154(b) by 1214 days.

(21) Appl. No.: 17/281,868

(22) PCT Filed: Oct. 4, 2019

(86) PCT No.: PCT/EP2019/076883

§ 371 (c)(1),
(2) Date: Mar. 31, 2021

(87) PCT Pub. No.: WO2020/070271

PCT Pub. Date: Apr. 9, 2020

(65) Prior Publication Data

US 2021/0395426 A1 Dec. 23, 2021

(30) Foreign Application Priority Data

Oct. 5, 2018 (EP) .................................... 18198965

(51) Int. Cl.

| | |
|---|---|
| ***C08F 283/10*** | (2006.01) |
| ***C09D 4/00*** | (2006.01) |
| ***C09D 151/08*** | (2006.01) |
| ***H01B 3/42*** | (2006.01) |

(52) U.S. Cl.

CPC .............. *C08F 283/10* (2013.01); *C09D 4/00* (2013.01); *C09D 151/08* (2013.01); *H01B 3/421* (2013.01)

(58) Field of Classification Search

CPC .. C08F 283/10; C08F 220/14; C08F 290/064; C08F 220/06; C08F 290/144; C09D 4/00; C09D 151/08; H01B 3/421; H01B 3/447; C08L 63/10; C08L 33/06; C08G 59/5033; B05D 7/14

See application file for complete search history.

(56) References Cited

U.S. PATENT DOCUMENTS

| | | | | |
|---|---|---|---|---|
| 4,803,115 | A | 2/1989 | Fushiki | |
| 4,954,304 | A | 9/1990 | Ohtake | |
| 5,032,453 | A | 7/1991 | Rogler | |
| 6,555,023 | B2 | 4/2003 | Smith | |
| 6,680,119 | B2 | 1/2004 | Smith | |
| 8,586,679 | B2 | 11/2013 | Klein Nagelvoort | |
| 2003/0044605 | A1 | 3/2003 | Smith | |
| 2003/0153718 | A1 | 8/2003 | Crump | |
| 2007/0218305 | A1 * | 9/2007 | Ishigaki ............... | C09D 175/16 428/500 |
| 2007/0252449 | A1 | 11/2007 | Ikeda | |
| 2009/0205856 | A1 | 8/2009 | Ishii | |
| 2009/0267535 | A1 | 10/2009 | Ashikaga | |
| 2012/0259039 | A1 | 10/2012 | Kobayashi | |
| 2013/0147307 | A1 | 6/2013 | Morooka | |
| 2014/0147639 | A1 | 5/2014 | Moon | |
| 2015/0252124 | A1 | 9/2015 | Gaefke | |
| 2015/0306790 | A1 | 10/2015 | Spyrou | |
| 2021/0009748 | A1 | 1/2021 | Liu | |

FOREIGN PATENT DOCUMENTS

| | | |
|---|---|---|
| CN | 1819408 | 8/2006 |
| CN | 108164686 | 6/2018 |
| KR | 100941903 | 2/2010 |
| WO | 2020070274 | 4/2020 |

OTHER PUBLICATIONS

Machine English translation of JP 2003-076008, Hasegawa (Year: 2003).*

Arkema; "GPS Safety Summary Substance Name: Trimethylolpropane Triacrylate", 2013, pp. 1-6.

International Patent Application No. PCT/EP2019/076883, International Search Report and Written Opinion, dated Jan. 28, 2020, 14 pages.

Mao, T.J., et al., "Photopolymerization Initiated by Triphenylphosphine", Journal of Polymer Science: Part A-1, vol. 5, 1967, pp. 1741-1751.

* cited by examiner

*Primary Examiner* — Jessica M Roswell

(74) *Attorney, Agent, or Firm* — Fitch, Even, Tabin & Flannery LLP

(57) ABSTRACT

The present invention relates to a composition comprising an epoxy and ester based resin, a reactive diluent and an initiator for a radical polymerization. Furthermore, the invention relates to a process for providing such composition, to a process for applying the composition, to the use of the composition as coating material and to the materials coated with the polymerized composition.

21 Claims, No Drawings

HYBRID RESINS FOR HIGH VOLTAGE APPLICATIONS

The present invention relates to a composition comprising an epoxy and ester based resin, a reactive diluent and an initiator for a radical polymerization. Furthermore, the invention relates to a process for providing such composition, to a process for applying the composition, to the use of the composition as coating material and to substrates coated with the polymerized composition.

BACKGROUND OF THE INVENTION

The present invention relates to a composition used as insulator in electric machines, such as rotating and non-rotating electric machines.

In electric machines, especially those subject to high voltage, insulating materials for the coils are extremely important for their performance and lifespan.

Common insulating materials are organic thermosetting polymers and their thermal, electrical, chemical and mechanical properties are key requirements for obtaining a long-term performance of the machines.

US 2012/0259039 discloses a resin composition for a fibre-reinforced composite material comprising an epoxy resin, an acid group-containing radical polymerizable monomer, such as acrylic or methacrylic acid and an amine-based curing agent for an epoxy resin.

US 2015/0306790 discloses a process for producing storage-stable epoxy prepregs and composites produced by this process using at least one reactive resin having at least one acid group and at least one epoxy-based reactive resin component, wherein one or both of the reactive resins comprises a group capable of free-radical polymerization.

U.S. Pat. Nos. 6,555,023 and 6,680,119 disclose an insulated electrical coil, which insulation is formed from a cured resinous composition of epoxy-anhydride resin that has been prereacted with an antioxidant oligomer selected from the group consisting of organophosphorous compounds, phenolics, thio-esters, thio-phosphites, thiazoles, lactones, hydroxylamines and maleimides.

Epoxy resins cured with anhydride, for example, have a higher viscosity, which is a disadvantage during the impregnation process. Anhydrides are also of potential health concerns and moisture sensitive. Unsaturated polyester resins have been used to achieve low viscosity solutions for easy mica tape penetration but the low viscosity solutions result in poor mechanical, thermal and/or chemical resistance. The styrene or vinyl toluene reactive diluents are also potentially toxic and flammable.

Thus, there is the need to find new materials suitable for impregnation and/or coating having a low viscosity and still good mechanical, thermal and/or chemical properties, especially for use as insulators in electric machines.

These problems are solved by the composition of the invention, which comprises a resin component, a reactive diluent and an initiator for radical polymerization.

One of the advantages of the composition of the invention is that it provides curing system without anhydride as a curing agent. Furthermore, the use of styrene or vinyl toluene can be drastically reduced or avoided.

Overall, the composition of the invention combines the advantages of having a low viscosity, which property is necessary for its application on a substrate, and at the same time the polymer obtained after curing the composition has good mechanical, thermal and chemical properties.

In other aspects, the invention relates to a process for producing the composition of the invention and to a process for applying the composition of the invention.

The invention also relates to the use of the composition of the invention as a coating on a substrate, in particular as insulation applied in electric machines.

DETAILED DESCRIPTION OF THE INVENTION

In a first embodiment, the invention relates to a composition comprising:

A) A resin component comprising:
  i. One or more, the same or different, group(s) of formula

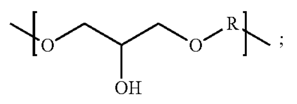

wherein R is an organic group having 2 to 40 carbon atoms;
  ii. One or more groups comprising two ester groups and one ethylenically unsaturated group;
  iii. One or more terminal or pendant groups comprising one ester group and one ethylenically unsaturated group;

B) at least one reactive diluent having at least one ethylenically unsaturated polymerizable group and having a boiling point at atmospheric pressure higher than 200° C.; and C) an initiator for radical polymerization.

In another embodiment, the invention relates to a composition comprising:

A) A resin component comprising:
  i. One or more, the same or different, group(s) of formula

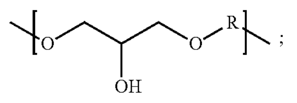

wherein R is an organic group having 2 to 40 carbon atoms;
  ii. One or more groups comprising two ester groups and one ethylenically unsaturated group;
  iii. One or more terminal or pendant groups comprising one ester group and one ethylenically unsaturated group;

B) at least one reactive diluent having at least one ethylenically unsaturated polymerizable group and having a boiling point at atmospheric pressure higher than 200° C.; and C) an initiator for radical polymerization wherein the resin component A has an acid value of not more than 50 mgKOH/g.

Within the meaning of this invention, R is an organic group comprising 2 to 40 carbon atoms, wherein the organic group comprises at least an aromatic group, an aliphatic group, a heteroaromatic group, a heteroaliphatic group or mixtures thereof. The aliphatic group can be linear, branched, cyclic or mixtures thereof.

In a further preferred embodiment, R comprises the hydrocarbon part of bisphenol A or bisphenol F units.

Within the meaning of the invention, the brackets [ ] indicate the attachment point of the group indicated within the brackets to the rest of the molecule.

In another preferred embodiment, in the composition of the invention the pendant or terminal groups iii. comprise acrylic ester, methacrylic ester or mixtures thereof.

Preferably, the ethylenically unsaturated groups are conjugated ethylenically unsaturated groups.

In the case of chemical compounds or compositions, the use of "consisting essentially of" or "comprising substantially" means that specific further components can be present, namely those not materially affecting the essential characteristics of the compound or composition.

In some embodiments, the resin component A consists of 90% by weight, preferably 95% by weight, more preferably 98% by weight of the groups i), ii) and iii) present in the resin component A calculated on the total weight of the resin component A.

In some embodiments, resin component A of the composition of the invention consists essentially of i. One or more, the same or different, groups of formula

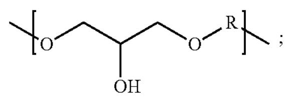

wherein R is an organic group comprising 2 to 40 carbon atoms ii. one or more groups comprising two ester groups and one ethylenically unsaturated group;

iii. One or more terminal or pendant groups comprising one ester group and one ethylenically unsaturated group.

In another preferred embodiment, in the composition of the invention the groups ii. comprises esters groups of fumaric acid, maleic acid, maleic anhydride, itaconic acid, citraconic acid, and mixtures thereof.

In another preferred embodiment, in the composition of the invention component A is a reaction product of A1) an epoxy resin;

A2) a compound comprising a) two carboxylic acid groups or a carboxylic acid anhydride group and b) one ethylenically unsaturated group, and A3) a compound having one carboxylic acid group and one ethylenically unsaturated group.

In a further preferred embodiment of the invention, the epoxy resin of component A1 further comprises bisphenol A and/or F units.

In a further preferred embodiment of the invention, component A3) is selected from acrylic acid, methacrylic acid and mixtures thereof.

In a further preferred embodiment of the invention, component A2 is selected from fumaric acid, maleic acid, maleic anhydride, itaconic acid, itaconic anhydride, citraconic acid, citraconic anhydride, and mixtures thereof. Most preferably, component A2 is selected from fumaric acid, maleic acid and maleic anhydride.

In a further preferred embodiment, component A of the composition of the invention has an acid number of at most 50 mgKOH/g, preferably component A of the composition of the invention has an acid number of at most 40 mgKOH/g, more preferably component A of the composition of the invention has an acid number of at most 30 mgKOH/g, most preferably component A of the composition of the invention has an acid number of at most 20 mgKOH/g.

Preferably, component A of the composition of the invention has an acid number in the range of 0 and 50 mgKOH/g, preferably in the range of 1 and 50 mgKOH/g, more preferably, component A of the composition of the invention has an acid number in the range of 0 and 40 mgKOH/g, preferably in the range of 1 and 40 mgKOH/g. More preferably component A of the composition of the invention has an acid number in the range of 0 and 30 mgKOH/g, preferably in the range of 1 and 30 mgKOH/g. Most preferably component A of the composition of the invention has an acid number in the range of 0 and 20 mgKOH/g, preferably in the range of 1 and 20 mgKOH/g. In a further preferred embodiment, component B of the composition of the invention is liquid at a temperature of 25° C.

In a further preferred embodiment, the Component B of the composition of the invention comprises at most 3% by weight of styrene and/or vinyl toluene reactive diluents calculated on the total weight of the composition. More preferably, Component B of the composition does not contain styrene and/or vinyl toluene reactive diluents.

In a further preferred embodiment, component B of the composition of the invention is present in an amount of 20 to 70% by weight, calculated on the total weight of the composition. In a more preferred embodiment, component B of the composition is present in an amount of 30 to 70% by weight, more preferably 40 to 70% by weight, more preferably 40 to 60% by weight, more preferably 40 to 55% by weight, calculated on the total weight of the composition.

In a further preferred embodiment, the composition of the invention is essentially free of epoxy groups.

In a further preferred embodiment, the composition of the invention has a viscosity in the range of 50 to 450 mPa*s at a temperature of 25° C. More preferably, the composition of the invention has a viscosity in the range of 100 to 450 mPa*s at a temperature of 25° C., more preferably 150 to 450 mPa*s at a temperature of 25° C.

In another embodiment, the invention relates to a process for preparing a treated substrate comprising a metal, comprising the steps of:

a. Providing the composition of the invention;

b. Applying the composition to a substrate comprising a metal; and c. Polymerizing the composition.

Within the meaning of the invention, step c. of the process for preparing a cured substrate can also be indicated as a curing step. In fact, in this step the ethylenically unsaturated groups of the resins of the composition of the invention are polymerized at a suitable temperature to achieve a radical polymerization in the presence of a catalyst suitable for a radical polymerization, such as a peroxide.

In another preferred embodiment, the substrate comprising a metal further comprises a tape, preferably a mica tape.

Typically, the tape is wrapped on the surface of the substrate. Mica tape means that the tape comprises mica. Any kind of tapes commonly used for insulating the metallic bars or substrates used in electric machines are suitable tapes according to the invention.

In another embodiment the invention relates to a treated substrate comprising a metal obtainable by the process for preparing a treated substrate, preferably the treated substrate further comprises a tape, more preferably a mica tape.

Within the meaning of the invention, the substrate comprising a metal is an electrical conductor. The metal could be copper, aluminum, iron, gold or other alloys used in electromechanical devices. The substrate is not limited to only a bar comprising a metal, but it is also understood to include one or more electrical conductors, e.g. wires or coils, wherein the wire or coils may be precoated or not.

The electrical conductors or the substrates may be at least partially coated on the metal surface or other materials may be applied on the metal surface, or even another form of insulation, such as a tape as described before, may be applied on an electrical conductor or substrate.

Optionally the substrate comprising a metal is wrapped with a mica tape for dielectric breakdown protection. The mica tape is most effective for dielectric breakdown protection when the air voids and moisture is replaced with an impregnating material, i.e., the composition of the invention, by a vacuum pressure impregnation procedure.

In another embodiment, the invention relates to a process for preparing the composition of the invention comprising the steps of a. Providing component A1) an epoxy resin, component A3) a compound having one carboxylic acid group and one ethylenically unsaturated group, and a catalyst in a reactor, optionally in the presence of one or more inhibitors of a radical polymerization, obtaining a mixture;
b. Reacting the mixture of step a. to obtain a first reaction product until the acid value of the first reaction product is less than 50 mgKOH/g;
c. Providing in the reactor component A2) a compound comprising a) two carboxylic acid groups or a carboxylic acid anhydride group and b) one ethylenically unsaturated group;
d. Further reacting the mixture of steps a. to c. to obtain a second reaction product until the acid value of the second reaction product is less than 50 mgKOH/g;
e. Adding to the second reaction product further components.

According to the invention the second reaction product results in component A of the composition of the invention and preferably, the further components added to component A are components B and C of the composition of the invention.

In a further preferred embodiment of the process for preparing the composition of the invention, the acid number of the first reaction product and the acid number of the second reaction product can be the same or different and is at most 50 mgKOH/g, preferably it is at most 40 mgKOH/g, more preferably it is at most 30 mgKOH/g, most preferably it is at most 20 mgKOH/g.

The ranges defined above for the acid numbers of the resin component A also apply for the reaction products of the process.

The advantage of the lower acid number is the better solubility in the monomer.

In another embodiment, the invention relates to the use of the composition of the invention for coating and/or impregnating a substrate.

Preferably, the composition is used for coating and/or impregnating electric machines, more preferably high voltage machines.

In another embodiment, the invention relates to the use of a treated substrate for electrical insulation, preferably in electric machines.

Within the meaning of the invention, reactive diluents are diluents having at least one ethylenically unsaturated polymerizable group and a boiling point higher than 200° C. Non-limiting examples of reactive diluents include vinyl ethers, acrylates, methacrylates, allyl groups, alkenes (also vinyl groups).

Preferably, the reactive diluents of the invention have at least two ethylenically unsaturated polymerizable groups. Most preferably, the reactive diluents of the invention have two ethylenically unsaturated polymerizable groups.

Most preferred reactive diluents are diallyl fumarate (DAF), tetraethylene glycol di-(meth)acrylate (TEGDMA), hexanediol di(meth)acrylate (HDDMA), butanediol dimethacrylate or mixtures thereof.

Within the meaning of the invention epoxy resins or epoxy based resins are those resins bearing at least one an epoxy group, preferably at least two epoxy groups per molecule. Preferred epoxy resins of the invention comprise one or more epoxy groups and a bisphenol A or a bisphenol F or a mixture of bisphenol A and F.

In a preferred embodiment, the composition is essentially free of epoxy groups.

Essentially free of epoxy groups also encompasses free of epoxy groups and it means that the epoxy equivalent weight of the material is at least 2000 g/eq, preferably of at least 3000 g/eq, more preferably at least 4000 g/eq, most preferably at least 5000 g/eq.

An initiator for a radical polymerization within the meaning of the invention is a compound suitable for starting a radical polymerization. Preferred initiators of a radical polymerization are peroxides. Most preferred is dicumyl peroxide.

Within the meaning of the invention, applying the composition of the invention on a substrate means that the substrate can be coated and/or impregnated with the composition of the invention.

A coating is a covering that is applied to the surface of a substrate, wherein the coating itself may be an all-over coating, i.e., completely covering the substrate, or it may only cover parts of the substrate.

A substrate is impregnated when it, at least partially, absorbs a liquid, in this case, the composition for impregnating a substrate. This means that cavities or empty spaces present in the substrate are at least partially covered by the composition of the invention a substrate.

EXAMPLES

Measurements

Examples 1 to 11

1. Preparation of the Reactive Composition

The resins were synthesized using a glass reactor equipped with a water-cooled condenser. A combination of nitrogen and air was bubbled into the reactor. Bisphenol F or Bisphenol A type epoxy resin (Epon 824, 344 grams) and inhibitors were added to the reactor and agitation was turned on. Glacial acrylic or methacrylic acid (140 grams) and Ancamine K54 (0.6 grams) catalyst were then added into the vessel, and the reaction mixture was heated to 99° C. An exotherm was observed that increased the temperature of the reaction to around 121° C. The solution was then held at 104-110° C. until the acid value decreased to less than 20 mg of KOH per gram of the reaction product. The material was then cooled to less than 82° C., and maleic anhydride (22 grams) was added. The reaction temperature was then increased to 104.4-110° C. until an acid value of less than 20 mg of KOH per gram of reaction product was achieved. The reaction was then separated into multiple samples, which were allowed to cool to room temperature. The reaction product was then re-melted, additional inhibitors added, and thinned with an diallyl fumarate (DAF, 415 grams), tetraethylene glycol di-(meth)acrylate (TEGDMA, 507 grams), hexanediol di(meth)acrylate (HDDMA, 507 grams), or butanediol dimethacrylate (BDDMA, 507 grams) monomer until a viscosity of around 400 cP or less was obtained. The material was then cooled to below 49° C. and dicumyl peroxide (5-20 grams) was added. Finally, the material was filtered through a 25-micron cloth. The chemical composition is detailed in Table 1 for examples 1-11.

TABLE 1

| EX | Resin | Reactive Diluent | Dicumyl peroxide |
|---|---|---|---|
| 1 | Bis F Epoxy with Methacrylic Acid and Maleic Anhydride | 40% DAF | 0.50% |
| 2 | Bis F Epoxy with Methacrylic Acid and Maleic Anhydride | 50% TEGDMA | 0.50% |
| 3 | Bis F Epoxy with Methacrylic Acid and Maleic Anhydride | 50% HDDMA | 0.50% |
| 4 | Bis F Epoxy with Methacrylic Acid and Maleic Anhydride | 50% BDDMA | 0.50% |
| 5 | Bis F Epoxy with Methacrylic Acid and Maleic Anhydride | 50% BDDMA | 1.00% |
| 6 | Bis F Epoxy with Methacrylic Acid and Maleic Anhydride | 50% BDDMA | 2.00% |
| 7 | Bis F Epoxy with Acrylic Acid and Maleic Anhydride | 45% DAF | 0.50% |
| 8 | Bis F Epoxy with Acrylic Acid and Maleic Anhydride | 50% TEGDMA | 0.50% |
| 9 | Bis F Epoxy with Acrylic Acid and Maleic Anhydride | 50% HDDMA | 0.50% |
| 10 | Bis F Epoxy with Acrylic Acid and Maleic Anhydride | 50% BDDMA | 0.50% |
| 11 | Bis A Epoxy with Methacrylic Acid and Maleic Anhydride | 50% BDDMA | 0.50% |

TABLE 2

| Physical Properties | | | | |
|---|---|---|---|---|
| Sample | Viscosity (mPa s) | SS gel at 120° C. (min) | Tg by MDSC (° C.) | Peak Max by MDSC (° C.) |
| 1 | 360 | 35.2 | 147 | 179 |
| 2 | 285 | 24.1 | 126 | 178 |
| 3 | 200 | 30.2 | 139 | 179 |
| 4 | 180 | 22 | 142 | 182 |
| 5 | 180 | 15.2 | 153 | 179 |
| 6 | 180 | 11.7 | 151 | 181 |
| 7 | 280 | 53.8 | 134 | 207 |
| 8 | 420 | 17.9 | 115 | 182 |
| 9 | 310 | 19.1 | 146 | 202 |
| 10 | 240 | 17.9 | 129 | n/a |
| 11 | 235 | 14.6 | 69 | 193 |

TABLE 3

| Mechanical Properties | | |
|---|---|---|
| | Bond Strength (N) | |
| Sample | at 25° C. | at 150° C. |
| 1 | 145.0 | 94.7 |
| 2 | 133.5 | 73.0 |
| 3 | 72.5 | 37.4 |
| 4 | 63.2 | 35.1 |
| 5 | — | — |
| 6 | — | — |
| 7 | 190.4 | 69.4 |
| 8 | 158.8 | 81.4 |
| 9 | 157.5 | 70.3 |
| 10 | 137.0 | 73.8 |
| 11 | 105.2 | 71.3 |

TABLE 3-continued

TABLE 4

| Electrical permittivity at Different Temperatures | | | | | | |
|---|---|---|---|---|---|---|
| | DC (1 kHz) | | | | | |
| Sample | at 25° C. | at 50° C. | at 100° C. | at 150° C. | at 180° C. | at 200° C. |
| 1 | 3.1991 | 3.2597 | 3.6926 | 4.1689 | 4.3712 | 4.7099 |
| 2 | 3.2684 | 3.3161 | 3.5151 | 3.7192 | 3.9112 | 4.4199 |
| 3 | 2.8571 | 2.8918 | 3.0389 | 3.2381 | 3.4848 | 3.6234 |
| 4 | 3.3680 | 3.4113 | 3.5671 | 3.9134 | 4.1429 | 4.2294 |
| 5 | — | — | — | — | — | — |
| 6 | — | — | — | — | — | — |
| 7 | 3.4242 | 3.9121 | 4.1515 | 4.8354 | 5.1080 | 5.4458 |
| 8 | 2.9957 | 3.1192 | 3.5121 | 3.9112 | 4.0086 | 4.0398 |
| 9 | 2.5402 | 2.9134 | 2.9957 | 3.2727 | 3.4719 | 3.6536 |
| 10 | 3.0476 | 3.0735 | 3.2078 | 3.2597 | 3.5930 | 3.8268 |
| 11 | 3.3000 | 3.4000 | 3.5000 | 4.0000 | 4.0000 | 4.3000 |

TABLE 5

| Dissipation Factor at Different Temperatures | | | | | | |
|---|---|---|---|---|---|---|
| | DF (1 kHz) | | | | | |
| Sample | at 25° C. | at 50° C. | at 100° C. | at 150° C. | at 180° C. | at 200° C. |
| 1 | 0.0151 | 0.0148 | 0.0222 | 0.0378 | 0.0917 | 0.1881 |
| 2 | 0.0063 | 0.0083 | 0.0144 | 0.0211 | 0.0319 | 0.0448 |
| 3 | 0.0096 | 0.0071 | 0.0136 | 0.0232 | 0.0298 | 0.0367 |
| 4 | 0.0082 | 0.0101 | 0.0146 | 0.0255 | 0.0298 | 0.0321 |
| 5 | — | — | — | — | — | — |
| 6 | — | — | — | — | — | — |
| 7 | 0.0200 | 0.0211 | 0.0310 | 0.0638 | 0.2353 | 0.3856 |
| 8 | 0.0092 | 0.0117 | 0.0211 | 0.0311 | 0.0440 | 0.1000 |
| 9 | 0.0096 | 0.0118 | 0.0114 | 0.0209 | 0.0254 | 0.0346 |
| 10 | 0.0090 | 0.0112 | 0.0106 | 0.0141 | 0.0232 | 0.0312 |
| 11 | 0.0010 | 0.0010 | 0.0120 | 0.0200 | 0.0220 | 0.0250 |

TABLE 6

| Dielectric strength before and after water immersion | | |
|---|---|---|
| | Dielectric strength (kV/mm) | |
| Sample | As-Is | 24 h in $H_2O$ |
| 1 | 295 | 381 |
| 2 | 533 | 491 |
| 3 | 455 | 446 |
| 4 | 665 | 322 |
| 5 | — | — |
| 6 | — | — |
| 7 | 362 | 353 |
| 8 | 566 | 507 |
| 9 | 395 | 595 |
| 10 | 302 | 269 |
| 11 | 376 | 178 |

Description of the Properties of the Material

Table 2 shows details the physical properties of each sample.

The viscosities of the composition of Examples 1 to 11 are below 450 mPas. Sunshine (SS) gel is a measure of reactivity and a useful in cure procedures needed.

The glass transition temperature (Tg) is measured on cured materials using a modulated differential scanning calorimeter (MDSC). Tg ranged from 69° C. to 153° C. depending on the reactive diluent used.

The mechanical properties were examined by bond strength using helical coils of MW35 magnet wire.

As shown in Table 3, the cured resins of the invention show good mechanical resistance. After an increase of 125° C. (from 25° C. to 150° C.) in the temperature, the bond strength decreases only about 50% of the value measured at 25° C., still maintaining good values especially for such an high temperature as 150° C.

Electrical properties of the resins are shown in Tables 4-6.

Dielectric strength indicates the maximum voltage material withstands depending on its thickness. This value was measured before and after water submersion. As shown in Table 6, the dielectric strength is not influenced by the water immersion and in some cases this property is improved after water immersion, which is unexpected.

All samples showed excellent electrical properties, since dissipation factor for all samples stays below 0.1 up to 150° C. The closer to zero dissipation factor, less energy is lost in insulating material.

The electrical permittivity, also known as dielectric constant, measured at various temperatures ranged from 25° C. to 200° C. is shown in Table 4. The small change in electrical permittivity is an important feature of high voltage systems, to avoid electrical charge concentration that could cause damages in long term use.

Table 5 is related to the measurement of the dissipation factor, that represents the amount of energy lost in the insulation. A constant and low dissipation factor in temperature is critical for production of a good high voltage insulation system; usually a value of 0.1 at high temperature, like more than 150° C., is considered as a threshold.

Methods

The above mentioned properties were measured according to the following methods.

Acid Number

The acid number is the KOH quantity in mg that is required for neutralizing 1 g of substance under the defined conditions. The acid numbers were determined by a neutralization reaction with a 0.1 N KOH in Ethanol according to DIN EN ISO 2114.

Viscosity was measured using a Brookfield LV viscometer at 25° C. using spindle Number 6 at 25 rpm per ISO 3219.

Dissipation factor and electrical permittivity (DF/DC) were measured at the same time per ASTM D 150, casting samples in small capacitors.

Bond strength was measured on impregnated helical coils per ASTM D2519.

Dielectric strength was measured per ASTM D149 on steel panel coated with resin samples.

GPC measurements were performed using Agilent Infinity 1260 GPC. The Infinity GPC is equipped with an Infinity 1260 Degasser. The Infinity GPC is equipped with an isocratic pump that is also model number Infinity 1260. The serial number is DEAB902598. Next the Infinity GPC contains attachments for thermostating the GPC columns and autosampler features. The solvent is tetrahydrofuran (THF) and supplied by Honeywell. The purity is 99.9% with a peroxide level of less than 2 mg/L. Samples to be analyzed are first dissolved in THE with mild agitation. The sample is then filtered through a 5 mL syringe with a 0.5 micron filter housing. The solution is collected with a 5 mL vial suitable for the autosampler. A lid with a rubber septum is then crimped onto the vial using an Agilent supplied vial crimper. After all the samples have been loaded into the autosampler, the method is started. The method is set to a flow rate of 1 mL/min of THE through a mixed D column (2 in series) supplied by Phenomenex. The mixed D columns are thermostated at 40° C. and the refractive index detector is baseline zeroed. The effluent is collected in a suitable container with proper venting. Samples are injected on the column per the method with an injection volume of 0.5 microliters per injection. The refractive index detector is thermostated at 40° C. also to prevent signal drift. The signal polarity is positive. The maximum pressure allowed on the column set is 600 bar. Analysis was performed with Agilent Chemstation software. Reference samples of polystyrene purchased from Agilent are run in a similar fashion to develop a calibration curve. The standards range in molecular weight of 500 to 30,000 daltons [g/mol]. The calibration curve can be a linear fit or first order or second order depending on the column set utilized.

The invention claimed is:

1. A composition comprising:

A) a resin component comprising:

i. one or more, the same or different, groups of formula

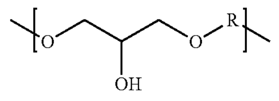

wherein R is an organic group comprising from 2 to 40 carbon atoms;

ii. one or more groups comprising two ester groups and one ethylenically unsaturated group; and iii. one or more terminal or pendant groups comprising one ester group and one ethylenically unsaturated group;

B) at least one reactive diluent comprising at least one ethylenically unsaturated polymerizable group and having a boiling point at atmospheric pressure higher than 200° C.; and C) a peroxide as an initiator for radical polymerization;

wherein the resin component A has an acid value of not more than 50 mgKOH/g, wherein the composition has a viscosity in the range of 50 to 450 cP at a temperature of 25° C.

2. The composition of claim 1, wherein R comprises the hydrocarbon part of a bisphenol A unit or a bisphenol F unit.

3. The composition of claim 1, wherein the one or more terminal or pendant groups iii. comprise one or more of an acrylic ester and a methacrylic ester.

4. The composition of claim 1, wherein the one or more groups ii. comprising two ester groups and one ethylenically unsaturated group comprises an ester group of one or more of fumaric acid, maleic acid, maleic anhydride, itaconic acid, and citraconic acid.

5. The composition of claim 1, wherein the resin component A is a reaction product of:

A1) an epoxy resin;

A2) a compound comprising: a) two carboxylic acid groups or a carboxylic acid anhydride group, and b) one ethylenically unsaturated group; and A3) a compound comprising one carboxylic acid group and one ethylenically unsaturated group.

6. The composition of claim 5, wherein the epoxy resin component A1 comprises one or more of a bisphenol A unit and a bisphenol F unit.

7. The composition of claim 5, wherein the compound A3 comprising one carboxylic acid group and one ethylenically unsaturated group comprises one or more of acrylic acid and methacrylic acid.

8. The composition of claim 5, wherein the compound A2 comprises: a) two carboxylic acid groups or a carboxylic acid anhydride group, and b) one ethylenically unsaturated group comprising one or more of fumaric acid, maleic acid, maleic anhydride, itaconic acid, itaconic anhydride, citraconic acid, and citraconic anhydride.

9. The composition of claim 1, wherein the at least one reactive diluent B is present in an amount of 20 to 70% by weight, calculated on the total weight of the composition.

10. A process of preparing a treated substrate comprising a metal, the process comprising:

a. providing a composition comprising:

A) a resin component comprising:

i. one or more, the same or different, groups of formula

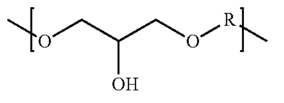

wherein R is an organic group comprising from 2 to 40 carbon atoms;

ii. one or more groups comprising two ester groups and one ethylenically unsaturated group; and iii. one or more terminal or pendant groups comprising one ester group and one ethylenically unsaturated group;

B) at least one reactive diluent comprising at least one ethylenically unsaturated polymerizable group and having a boiling point at atmospheric pressure higher than 200° C.; and C) a peroxide as an initiator for radical polymerization; wherein the resin component has an acid value of not more than 50 mgKOH/g, wherein the composition has a viscosity in the range of 50 to 450 cP at a temperature of 25° C.;

b. applying the composition to a substrate comprising a metal; and c. polymerizing the composition.

11. The process of claim 10, wherein the substrate comprising a metal further comprises a tape.

12. A treated substrate comprising a metal obtained by the process of claim 10.

13. A process for preparing a composition, the process comprising:

preparing a resin component A by:

providing A1) an epoxy resin, A3) a compound having one carboxylic acid group and one ethylenically unsaturated group, and a catalyst in a reactor, optionally in the presence of one or more inhibitors of a radical polymerization, obtaining a mixture;

reacting the mixture to obtain a first reaction product until the acid value of the first reaction product is less than 50 mgKOH/g;

providing in the reactor A2) a compound comprising a) two carboxylic acid groups or a carboxylic acid anhydride group, and b) one ethylenically unsaturated group;

further reacting the mixture to obtain a second reaction product until the acid value of the second reaction product is less than 50 mgKOH/g; and adding to the resin component A:

at least one reactive diluent B comprising at least one ethylenically unsaturated polymerizable group and having a boiling point at atmospheric pressure higher than 200° C.; and a peroxide as an initiator C for radical polymerization, wherein the resulting composition has a viscosity in the range of 50 to 450 cP at a temperature of 25° C.

14. A method of treating a substrate, the substrate comprising a metal, the method comprising one or more of:

coating the substrate with the composition of claim 1; and impregnating the substrate with the composition of claim 1.

15. An electric machine comprising electrical insulation, the electrical insulation comprising the treated substrate of claim 12, wherein the metal is a wire.

16. The process of claim 10, wherein the resin component A is a reaction product of:

A1) an epoxy resin;

A2) a compound comprising: a) two carboxylic acid groups or a carboxylic acid anhydride group, and b) one ethylenically unsaturated group; and A3) a compound comprising one carboxylic acid group and one ethylenically unsaturated group.

17. The process of claim 10, wherein the at least one reactive diluent B is present in an amount of 20 to 70% by weight, calculated on the total weight of the composition.

18. The process of claim 13, wherein the resin component A is a reaction product of:

A1) an epoxy resin;

A2) a compound comprising: a) two carboxylic acid groups or a carboxylic acid anhydride group, and b) one ethylenically unsaturated group; and A3) a compound comprising one carboxylic acid group and one ethylenically unsaturated group.

19. The process of claim 18, wherein the epoxy resin component A1 comprises one or more of a bisphenol A unit and a bisphenol F unit.

20. The process of claim 13, wherein the at least one reactive diluent B is present is an amount of 20 to 70% by weight, calculated on the total weight of the composition.

21. The method of claim 14, wherein the resin component A is a reaction product of:

A1) an epoxy resin;

A2) a compound comprising: a) two carboxylic acid groups or a carboxylic acid anhydride group, and b) one ethylenically unsaturated group; and A3) a compound comprising one carboxylic acid group and one ethylenically unsaturated group.

* * * * *